United States Patent
Hanamoto

(10) Patent No.: US 8,363,270 B2
(45) Date of Patent: Jan. 29, 2013

(54) IMAGE PROCESSING METHOD, IMAGE PROCESSING APPARATUS AND COMPUTER PROGRAM

(75) Inventor: Takashi Hanamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 12/429,291

(22) Filed: Apr. 24, 2009

(65) Prior Publication Data

US 2009/0273819 A1    Nov. 5, 2009

(30) Foreign Application Priority Data

Apr. 30, 2008 (JP) .................. 2008-119058

(51) Int. Cl.
*H04N 1/60* (2006.01)
*H04N 1/46* (2006.01)
*G09G 3/16* (2006.01)

(52) U.S. Cl. ............... 358/1.9; 358/509; 345/48

(58) Field of Classification Search ............ 358/1.9, 358/509, 515, 518; 345/48, 690, 697
See application file for complete search history.

(56) References Cited

U.S. PATENT DOCUMENTS

| | | | |
|---|---|---|---|
| 6,431,669 B1 * | 8/2002 | Silverbrook | 347/2 |
| 2002/0149546 A1 * | 10/2002 | Ben-Chorin et al. | 345/32 |
| 2004/0201598 A1 * | 10/2004 | Eliav et al. | 345/698 |
| 2008/0218784 A1 * | 9/2008 | Ben-Chorin et al. | 358/1.9 |

FOREIGN PATENT DOCUMENTS

JP       9-46535       2/1997

\* cited by examiner

*Primary Examiner* — Madelein A Nguyen

(74) *Attorney, Agent, or Firm* — Fitzpatrick, Cella, Harper & Scinto

(57) ABSTRACT

An image processing method displays a simulation image of an image formed on a print medium under a first light-source color on a display under a second light-source color. The method includes an acquisition step of acquiring image data to be simulated in a format according to the second light-source color, a step of calculating a reflective color obtained when the acquired image data is processed to represent an image corresponding to the image data illuminated by an achromatic light-source color, a step of converting the first light-source color into the format according to the second light-source color, and calculating a glossy color of the image data based on the converted first light-source color, and a generation step of generating an image to be displayed by adding the reflective color calculated in the reflective color calculation step and the glossy color calculated in the glossy color calculation step.

10 Claims, 8 Drawing Sheets

IMAGE PROCESSING METHOD, IMAGE PROCESSING APPARATUS AND COMPUTER PROGRAM

BACKGROUND OF THE INVENTION

1. Field of the Invention

The present invention relates to a technique that simulates an image formed on a print medium.

2. Description of the Related Art

In general, a material printed using a printer or the like is assumed to be observed under an illumination at a color temperature of 5000K called D50. For this reason, when a print result is to be simulated on the monitor of a personal computer or the like prior to actual printing, display processing is executed under the assumption that a printed material is to be observed under the D50 illumination. Such simulation of a printed material is called soft proofing, which is executed using a color matching system (to be abbreviated as CMS hereinafter). A technique for simulating the appearance of a printed material under an illumination other than D50 is also known (for example, see Japanese Patent Laid-Open No. 09-046535). Such simulation techniques can reproduce most of print results on a monitor although its precision depends on the performance of the engine that executes the CMS, the monitor and the printer, and a color profile that describes the characteristics of a print medium.

SUMMARY OF THE INVENTION

However, not only does the impression of an observer who observes an actual printed material depend on the color of the printed material, but also it is largely influenced by a glossy component of the print medium itself. For this reason, upon comparison of the display result simulated on a monitor by the conventional simulation technique with the actual printed material, the observer may often feel the monitor output is unnatural. That is, not only does the color of an image need to be taken into account, but also the glossy component of a print medium has to be taken into consideration, so as to attain simulation closer to the real printed material.

The present invention provides an image processing method and image processing apparatus, which can attain a simulation closer to a real printed material in consideration of the glossy component of a print medium.

According to an exemplary embodiment of the present invention, the present invention relates to an image processing method for displaying a simulation image of an image formed on a print medium under a first light-source color on a display device under a second light-source color, comprising, an acquisition step of acquiring image data to be simulated in a format according to the second light-source color, a reflective color calculation step of calculating a reflective color obtained when the acquired image data is located under an achromatic light-source color, a glossy color calculation step of converting the first light-source color into the format according to the second light-source color, and calculating a glossy color of the image data based on the converted first light-source color, and a generation step of generating an image to be displayed by adding the reflective color calculated in the reflective color calculation step and the glossy color calculated in the glossy color calculation step.

Further features of the present invention will become apparent from the following description of exemplary embodiments with reference to the attached drawings.

DESCRIPTION OF THE EMBODIMENTS

Exemplary embodiments of the present invention will be described in detail hereinafter with reference to the accompanying drawings. Note that the arrangements described in the following embodiments are merely examples, and the present invention is not limited to the illustrated arrangements.

First Embodiment

This embodiment is characterized in that a color processing result based on a CMS is displayed while being added with a glossy component of a print medium upon simulating the printed material.

[System Arrangement]

Figure 1:
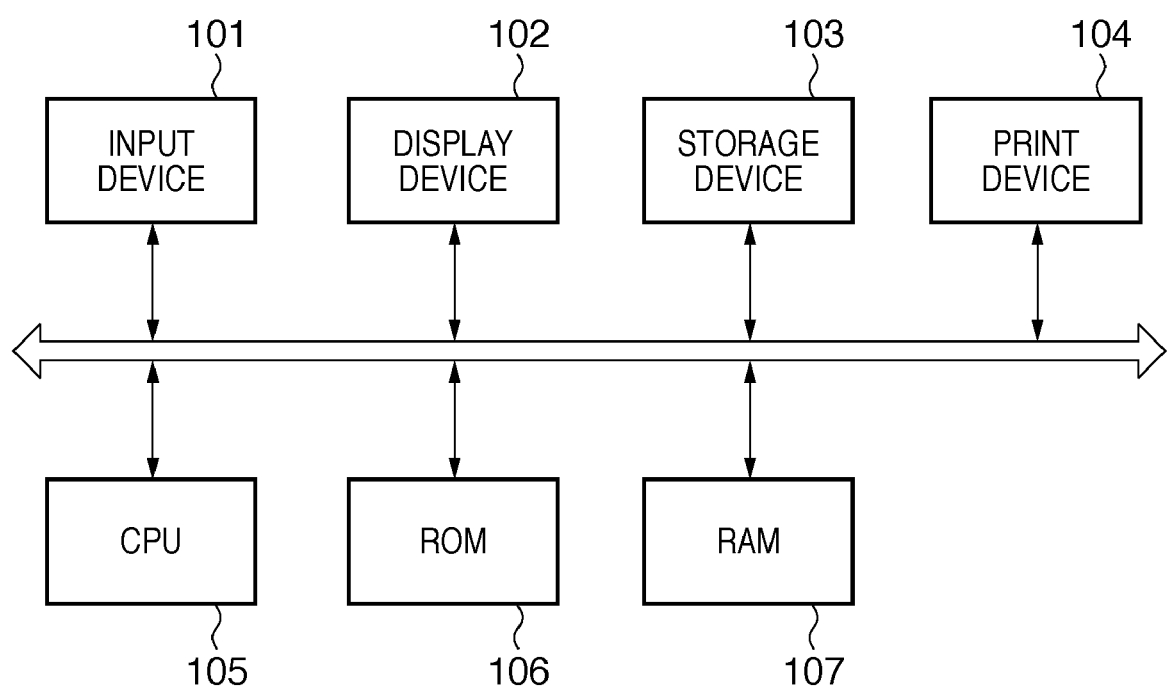
FIG. 1 is a block diagram showing an example of the system arrangement according to an embodiment of the present invention.

FIG. 1 is a block diagram showing the system arrangement according to this embodiment. Referring to FIG. 1, an input device 101 is used to input user instructions and data, and includes a keyboard and a pointing system such as a mouse. A display device 102 is a monitor that displays a GUI and the like, and normally includes a CRT or liquid crystal display. Hence, the display device 102 will also be simply referred to as a monitor hereinafter. A storage device 103 stores image data, programs, and the like, and normally includes a hard disk. A print device 104 prints image data on a print medium, and is implemented as printers of various systems. Hence, the print device 104 will also be simply referred to as a printer hereinafter. In this embodiment, a printed material, which is to be obtained when image data input from the input device 101 is printed by the printer 104, is simulated on the monitor 102.

A CPU 105 associates with all processes of the aforementioned components. A ROM 106 holds various control programs, fixed values, and the like. A RAM 107 provides programs, data, a work area, and the like required in this embodiment to the CPU 105.

Assume that control programs required to implement the processes shown in the flowcharts to be described later are stored in the ROM 106 or storage device 103, and are executed after they are temporarily loaded onto the RAM 107. The system arrangement of this embodiment may include various components in addition to the aforementioned components. However, since these components are not included in the scope of the present invention, a description thereof will not be given.

[Printed Material Simulation Method (Overview)]

Figure 2:
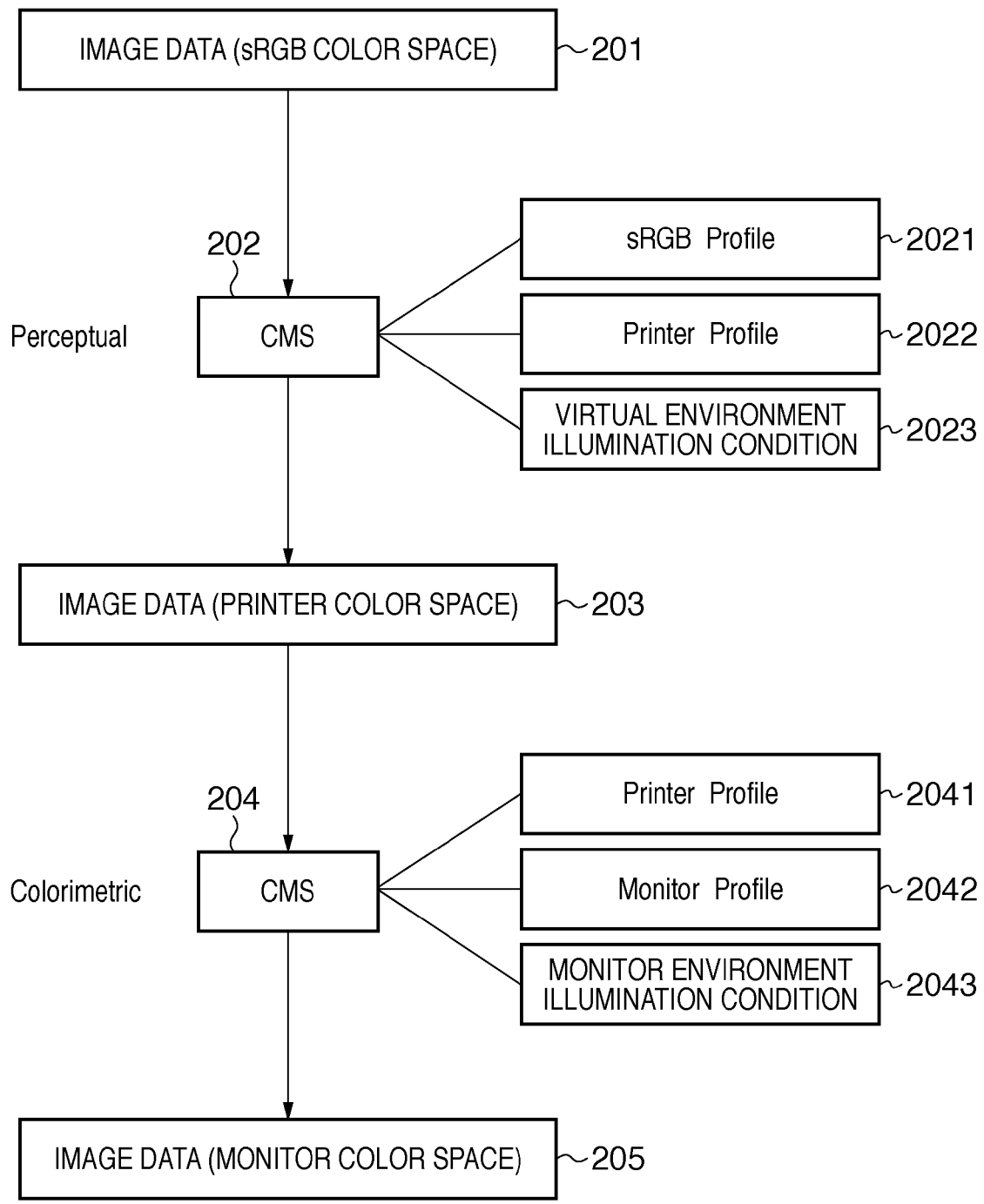
FIG. 2 is a diagram showing an overview of a simulation method of a printed material according to this embodiment.

An overview of a printed material simulation method according to this embodiment will be described below with reference to FIG. 2. FIG. 2 is a chart illustrating a method of simulating, on, for example, the monitor 102, the color of a printed material obtained upon outputting image data on an sRGB color space using, for example, the printer 104.

Image data 201 sensed on the sRGB color space is converted into image data 203 on a printer color space via a CMS engine 202 (first color conversion). In this case, input and output profiles, and an illumination condition of the environment where a printed material is placed are designated in the CMS engine 202. In this example, since the image data is that on the sRGB color space, an sRGB color space profile 2021 is designated as the input profile. However, when image data is not sRGB data, a profile associated with the image is designated. As the output profile, a printer color space profile 2022 is designated. As the printer color space profile 2022, various profiles are prepared in correspondence with printer models, print media, and print qualities, and a profile suited to the condition has to be selected. As an illumination condition (virtual environment illumination condition) 2023, the color temperature of an illumination under which the printed material is to be observed, and the type of a fluorescent lamp (high color rendering type, three-band type, normal type) are designated. Note that an arbitrary rendering intent in the CMS engine 202 may be used, but "Perceptual" is used in this case. As a result, when the image data 201 is input to the CMS engine 202, the image data 203 on the printer color space under the designated illumination condition is obtained. At this time, when the color temperature of the illumination is low, RGB values shift in an orange direction; when the color temperature is high, RGB values shift in a blue direction.

Next, the image data 203 converted into the printer color space by the first color conversion is converted into image data 205 on a monitor color space via a CMS engine 204 (second color conversion). In this case, input and output profiles, and an illumination condition of an observation environment of the monitor are designated in the CMS engine 204. In this example, a printer color space profile 2041 is designated as the input profile. Also, a monitor color space profile 2042 is designated as the output profile. As the monitor color space profile 2042, a profile distributed from a manufacturer or that created using a dedicated calibration device is used. As an illumination condition (monitor environment illumination condition) 2043, the color temperature of an illumination, and the type of a fluorescent lamp (high color rendering type, three-band type, normal type) are designated. However, since the monitor is a self-emitting device, the influence of the monitor environment illumination condition 2043 in the CMS engine 204 is small. Therefore, the monitor environment illumination condition 2043 may be omitted. In this case, a high color rendering type of 5000K is designated as a default illumination condition. As a rendering intent in the CMS engine 204, "Absolute Colorimetric" free from any chromaticity value deviation is designated. As a result, when the image data 203 is input to the CMS engine 204, the image data 205 on the monitor color space can be obtained. By displaying this image data on the monitor, the color of a printed material can be simulated.

[Reflective Color Calculation]

In this embodiment, a printed material is simulated on the monitor using computer graphics (CG). That is, a simulation image (to be referred to as a proof image hereinafter) of the printed material is generated using a CG. In this case, a light-source color is set on the CG, and reflection based on the virtual light-source color is added to the proof image, thus expressing gloss on the printed material.

A calculation method of a reflective color of a three-dimensional object (to be referred to as a 3D object hereinafter) in the CG will be described below with reference to FIG. 3.

In general, the calculation of the reflection includes two models, that is, a diffuse reflection model used to calculate a color of a material, and a glossy reflection model used to calculate a glossy color of the material. After the reflective colors are calculated by these models, they are added. Note that all reflective colors assume RGB values on the sRGB color space.

Figure 3:
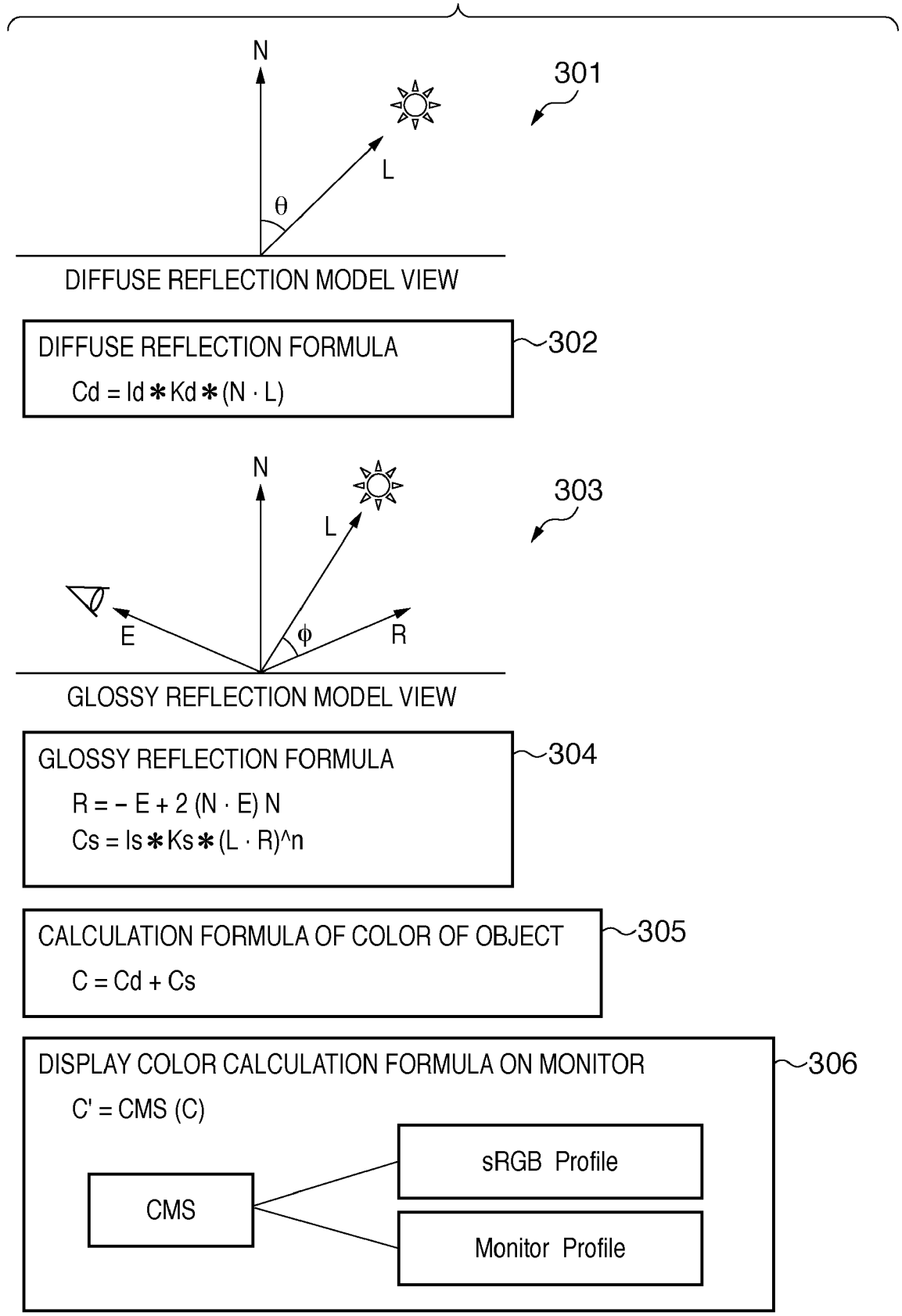
FIG. 3 is a view showing a calculation method of a reflective color in a CG according to this embodiment.

In FIG. 3, reference numeral 301 denotes a diffuse reflection model view, in which N is a normal vector indicating the normal direction to the material surface, and L is a light-source vector indicating the direction of a light source. A formula 302 is a calculation formula of a diffuse reflective color based on the diffuse reflection model 301. In the formula 302, Id is a parameter that represents a light-source color, Kd is a parameter that represents a surface color of the material and its reflection intensity, and N·L is an inner product of the vectors N and L.

Also, a view 303 is a glossy reflection model view, in which N is a normal vector indicating the normal direction to the material surface, L is a light-source vector that represents the direction of a light source, E is a visual axis vector of a visual axis direction, and R is a reflected vector of the vector E. A formula 304 is a calculation formula of a glossy reflective color based on the glossy reflection model 303. In the formula 304, Is is a parameter that represents a light-source color, and is the same as the parameter Id. Ks is a parameter which represents the color of a glossy component and its reflection intensity, L·R is an inner product of the vectors R and L, and n is a parameter that indicates a degree of diffusion of gloss.

When the reflective colors Cd and Cs can be calculated in the respective reflection models, they are added to each other, as given by a formula 305, thus calculating a final reflective color C.

Finally, a CMS engine 306 converts the reflective color C from the sRGB color space to the monitor color space, and outputs the converted color to the monitor, thus displaying the reflective color of the 3D object.

[Determination of Light-Source Color]

A determination method of the light-source color on the CG will be described below with reference to a diagram shown in FIG. 4. XYZ values of an assumed light source are acquired. Since data of representative light sources are published on the Internet or the like, it is easy to acquire these data. Also, an actual light source may be measured using a dedicated measuring device.

A white point on the obtained XYZ space is moved to 6500K in correspondence with the sRGB color space. Then, 3×3 matrix conversion from XYZ to RGB is executed to calculate a light-source color 401 on the sRGB color space.

Furthermore, a CMS engine 402 executes color conversion from the sRGB color space to the monitor color space, thus calculating a light-source color 403 on the monitor color space. In this case, input and output profiles, and the illumination condition of an observation environment of the monitor are designated in the CMS engine 402. In this example, an sRGB color space profile 4021 is designated as the input profile, and a monitor color space profile 4022 is designated as the output profile. Also, a monitor environment illumination condition 4023 indicating the high color rendering type of 5000K as a default is designated as the illumination condition.

Note that the RGB values of the obtained light-source color 403 generally shift in an orange direction when the color temperature is low, and shift in a blue direction when the color temperature is high.

Figure 4:
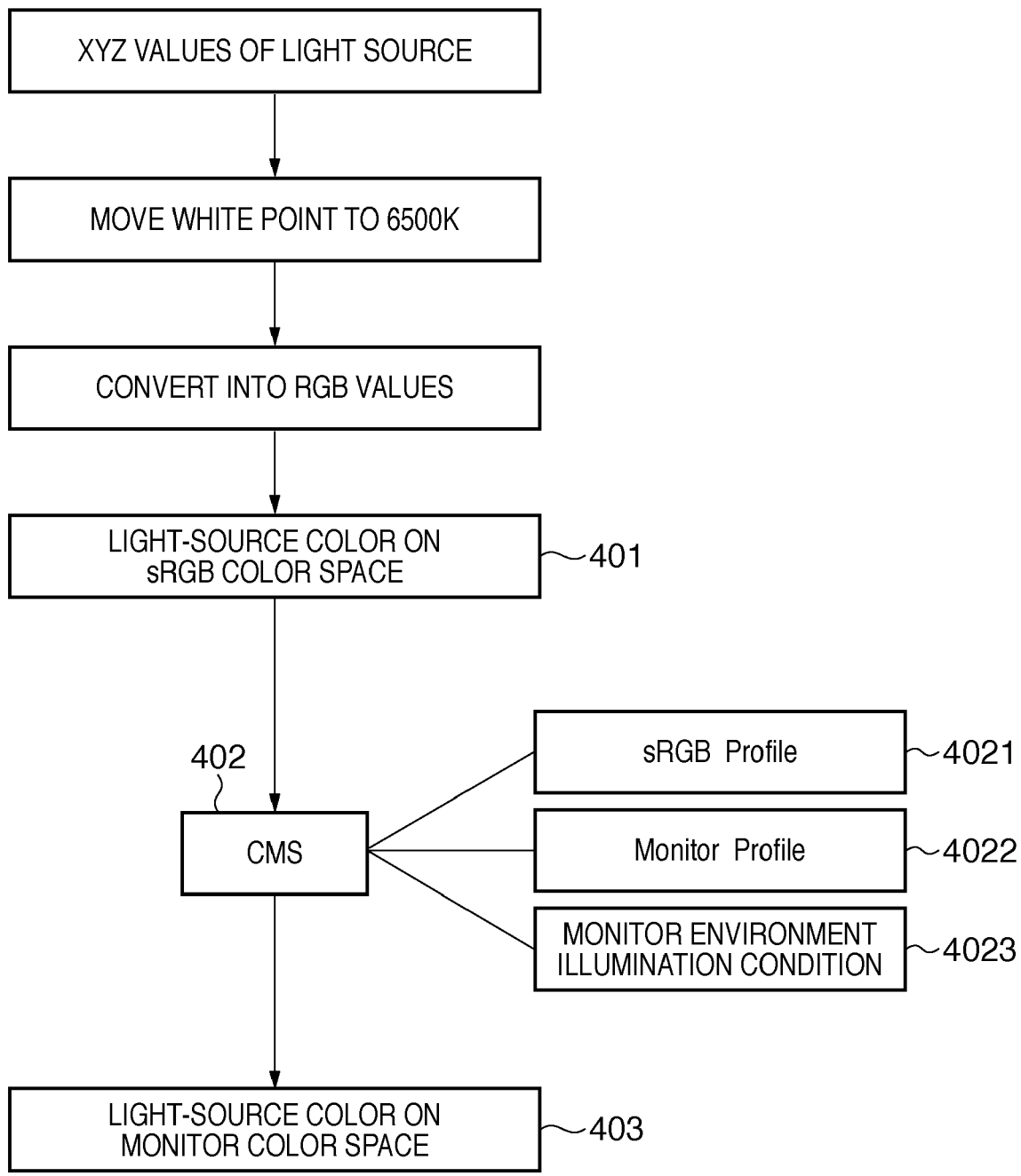
FIG. 4 is a diagram showing a determination method of a light-source color in a CG according to this embodiment.

In this embodiment, as shown in FIG. 4, upon converting the XYZ values of a light source onto the monitor color space, they are temporarily converted into the sRGB color space. Alternatively, the XYZ values may be directly converted into the monitor color space using a monitor profile.

[Virtual Environment 3D Model]

The virtual environment required to add a glossy component to the printed material on the CG will be described using a 3D model shown in FIG. 5.

Figure 5:
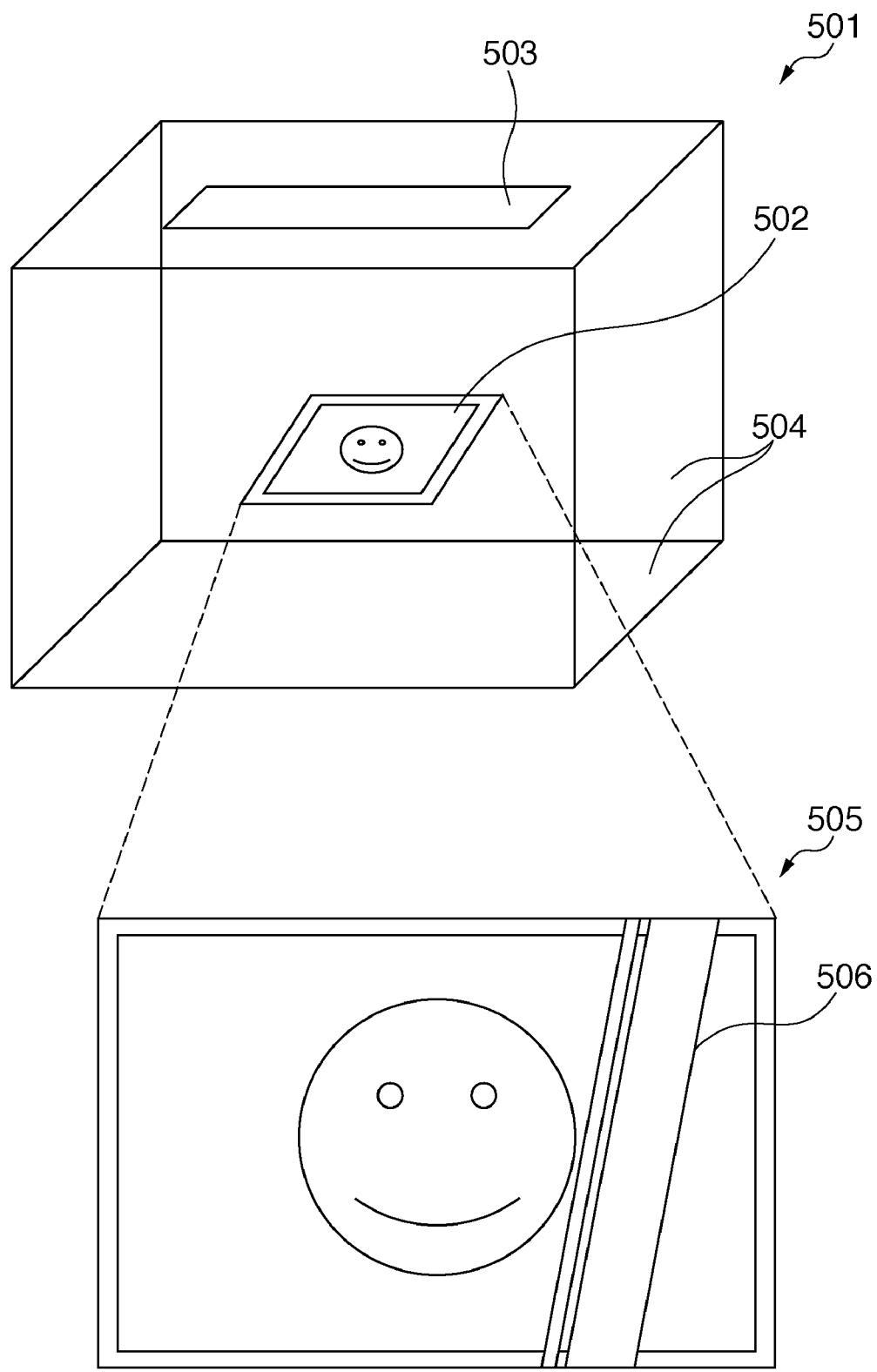
FIG. 5 is a three-dimensional model showing an example of a virtual environment in a CG according to this embodiment.

According to FIG. 5, in this embodiment, 3D objects 504 such as a wall, ceiling, and floor are set in a virtual environment 501, and an illumination 503 is then set. Assume that this illumination 503 emits light having the light-source color obtained by the method shown in FIG. 4. Finally, a printed material 502 as an object to be simulated is set near the center of the virtual environment 501. That is, the 3D objects 504 serve as peripheral image data displayed around the printed material 502 at the time of simulation. Using this environment, the reflective color of light, which is emitted from the illumination 503 and hits the printed material 502 and 3D objects 504, can be calculated using the reflection model shown in FIG. 3. The reason the 3D objects 504 other than the printed material are set around the printed material 502 in the virtual environment 501 is to reproduce reflection on the printed material 502 and to realize an environment closer to an actual observation environment.

Reference numeral 505 denotes an enlarged view of the printed material 502 in the virtual environment 501. As can be seen from this view, a glossy component 506 appears as a result of reflection of the illumination 503.

[Generation of Simulation Image (Printed Material)]

Processing for especially inputting image data as an object to be printed, and generating an image to be displayed as the printed material 502 in the virtual environment 501 shown in FIG. 5 in the simulation processing of this embodiment will be described in detail below with reference to the flowchart of FIG. 6.

In step S601, image data on the sRGB color space, which serves as an object to be simulated, is input. In step S602, an illumination condition I in the virtual environment 501 shown in FIG. 5 is input as a first light-source color upon observing a print medium. As the illumination condition I, the color temperature of the illumination 503 and the type of a fluorescent lamp are input.

In step S603, a printer profile is input. In step S604, the CMS engine 202 converts the input image data from the sRGB color space to the printer color space. As described above, as a rendering intent in the CMS engine 202, "Perceptual" is designated. As a result, the CMS engine 202 executes color conversion according to the illumination condition I of the virtual environment 501 input in step S602.

In step S605, a monitor profile is input. In step S606, the CMS engine 204 converts the image data from the printer color space to the monitor color space. As described above, as a rendering intent in the CMS engine 204, "Absolute Colorimetric" is designated. Also, assume that the high color rendering type of 5000K as a default is designated as the monitor environment illumination condition 2043 for the CMS engine 204. That is, since the monitor environment illumination condition is set as a second light-source color upon observing the monitor, image data according to the monitor environment illumination is obtained by the color conversion in this step.

The processes until step S606 follow the sequence described in FIG. 2 above, thus completing simulation associated with the color, that is, acquisition of a proof image.

Next, lighting processing using a CG is applied to the image data in the virtual environment 501. That is, the image data converted into the monitor color space in step S606 is converted into texture data of a CG, and the converted data is set as the printed material 502 in the virtual environment 501 and is illuminated with light from the illumination 503.

When a reflection model using a chromatic light-source color is applied to the image data whose color simulation is complete, the tincture suffers a large change, and the accuracy of the simulation result is reduced. This is the influence of the light-source color parameter Id in the diffuse reflection formula 302 shown in FIG. 3. Hence, in this embodiment, the light-source color of the illumination 503 is temporarily set to be an achromatic color in step S607, thereby keeping the color simulation result intact. Note that the achromatic color is white on the monitor color space.

In step S608, a reflective color is calculated based on the diffuse reflection formula 302 by applying an achromatic light source to the printed material 502 in the virtual environment 501. Since the image data converted into the monitor color space is plotted on the printed material 502, a value obtained by multiplying the value of the image data converted into the monitor color space by the reflection intensity of a print medium is set as the parameter Kd in the diffuse reflection formula 302. As the parameter Id indicating the light-source color, white indicating the achromatic light source is set. By setting the respective parameters of the diffuse reflection formula 302 in this way, a change in brightness when the printed material 502 tilts can be reproduced.

Upon completion of the lighting processing for the printed material 502, gloss addition processing for adding a glossy component to the printed material 502 is then executed. That is, a light-source color Iv upon observing the illumination condition I in the virtual environment 501 on the monitor color space is determined in step S609. The determination processing of the light-source color Iv in this step is executed according to the sequence shown in FIG. 4, that is, using the CMS engine 402, and the light-source color 403 on the monitor color space is finally calculated as RGB values. In step S610, the obtained light-source color Iv is set as the light-source color of the illumination 503.

In step S611, a glossy color is calculated based on the glossy reflection formula 304 using the light-source color Iv with respect to the printed material 502. That is, the light-source color Iv is set as the parameter Is indicating the light-source color in the glossy reflection formula 304, and a value obtained by multiplying white as the glossy color by the reflection intensity is set as the parameter Ks. The reason the light-source color Iv is used to reproduce a glossy component in this way is to naturally composite the glossy component on the color of the image data. For example, when the illumination condition is an illumination of 2800K, image data is converted into a color in the orange direction. When a white glossy component is composited on that image data, it is unnaturally displayed. Hence, using Iv as the light-source color, since the glossy component is also converted into a color in the orange direction, it can be naturally displayed.

Finally, in step S612 the reflective color calculated in the reflective color calculation processing in step S608 above and the glossy color calculated in the glossy color calculation processing in step S611 are added. As a result, a display color of the printed material 502 on the monitor is acquired, thus completing generation of an image to be displayed for simulation.

[Generation of Simulation Image (3D Object)]

Processing of especially generating images to be displayed of the 3D objects 504 as peripheral images of the printed material 502 in the virtual environment 501 in the simulation processing of this embodiment will be described in detail below with reference to the flowchart of FIG. 7.

Step S701 is a peripheral image acquisition step, and respective colors of the 3D objects 504 are input. In step S702, the illumination condition I in the virtual environment 501 is input. As the illumination condition I, the color temperature of the illumination 503 and the type of a fluorescent lamp are input.

In step S703, a light-source color Ivs upon observing the illumination condition I in the virtual environment 501 on the sRGB color space is determined. The determination processing of the light-source color Ivs in this step is executed according to the sequence shown in FIG. 4, and the light-source color 401 on the sRGB color space is calculated as RGB values. In step S704, the obtained light-source color Ivs is set as that of the illumination 503.

Next, step S705 is a peripheral reflective color calculation step, and a reflective color is calculated based on the diffuse reflection formula 302 using the light-source color Ivs with respect to the 3D objects 504. Note that the light-source color Ivs is set in the parameter Id indicating the light-source color in the diffuse reflection formula 302, and a value obtained by multiplying the color of each 3D object 504 by the reflection intensity of a print medium is set in the parameter Kd.

Step S706 is a peripheral glossy color calculation step, and a glossy color is calculated based on the glossy reflection formula 304 using the light-source color Ivs with respect to the 3D objects 504. Note that the light-source color Ivs is set in the parameter Is indicating the light-source color in the glossy reflection formula 304, and a value obtained by multiplying white as a glossy color by the reflection intensity is set in the parameter Ks.

Step S707 is a display peripheral image generation step, and the reflective color and glossy color, which are calculated in the aforementioned steps, are added to each other to calculate the display color of each 3D object 504, thereby generating a peripheral image to be displayed.

Step S708 is a display peripheral image conversion step, and a monitor profile is input. In step S709, the CMS engine 402 converts the display color (peripheral image to be displayed) calculated in step S707 from the sRGB color space to the monitor color space. As a result, the display color of each 3D object 504 on the monitor can be acquired.

[Soft Proofing Processing (Composite Display)]

Figure 6:
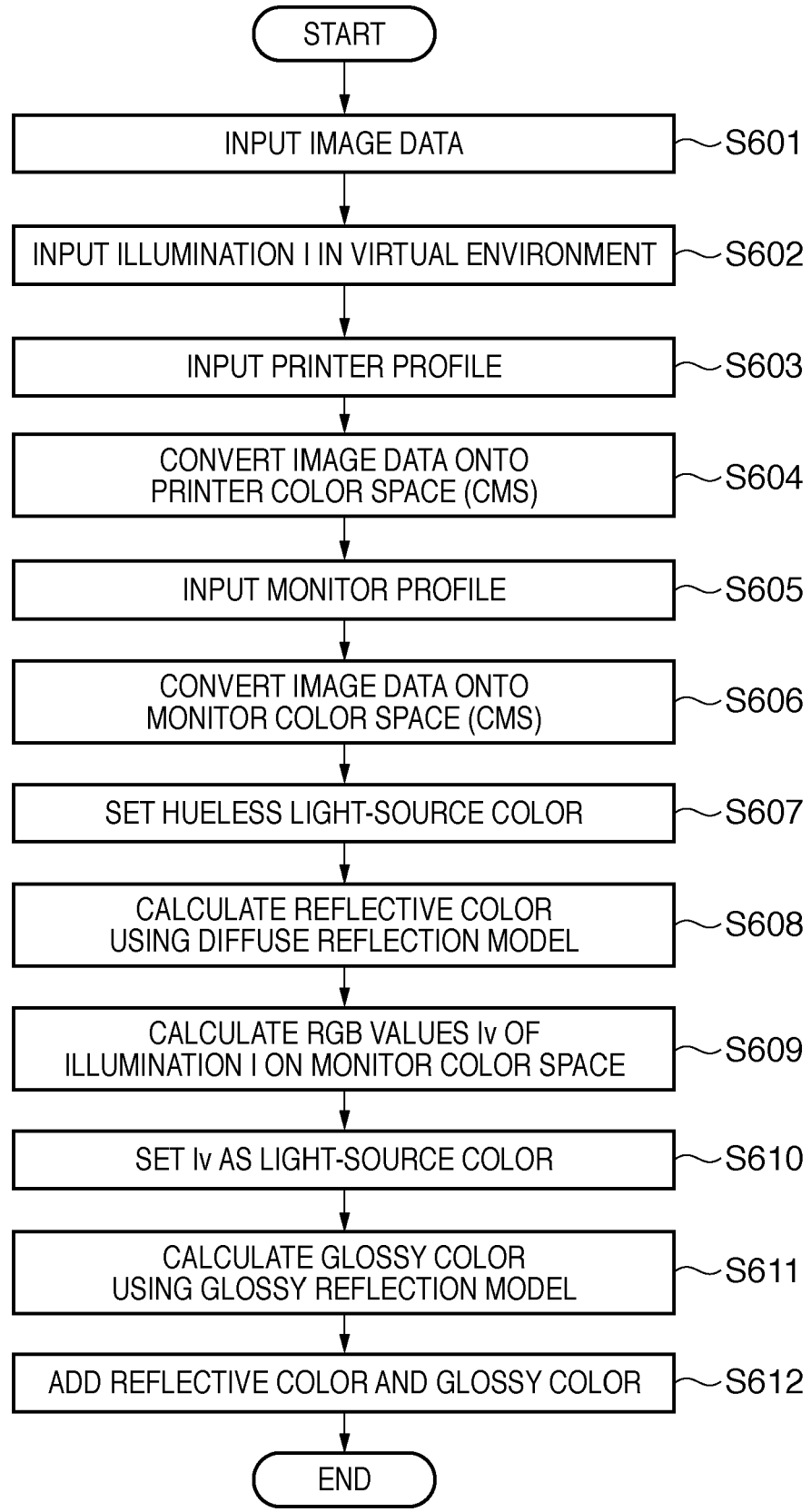
FIG. 6 is a flowchart showing simulation image generation processing of a printed material according to this embodiment.
Figure 7:
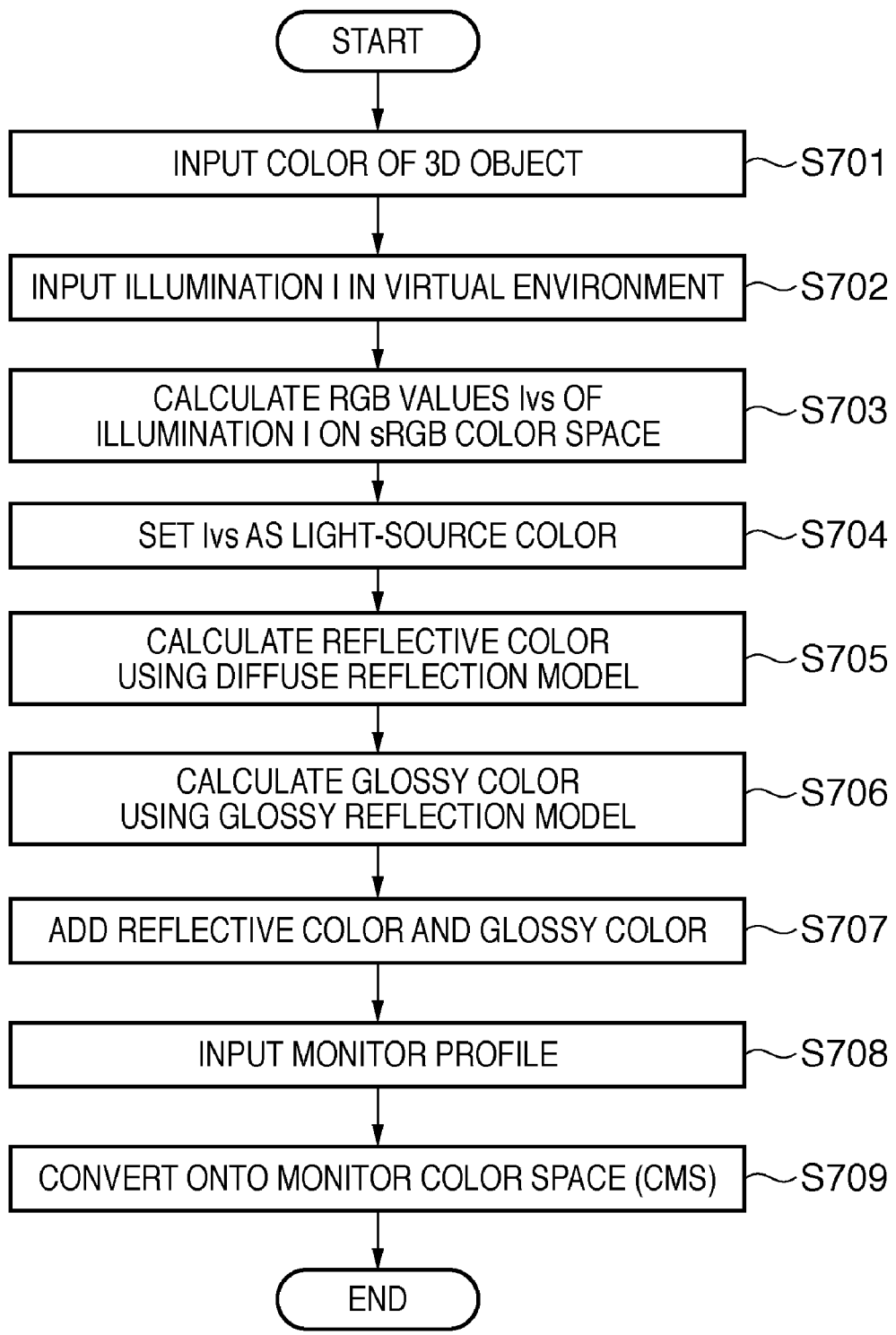
FIG. 7 is a flowchart showing simulation image generation processing of a 3D object according to this embodiment.

With the processes shown in the flowcharts of FIGS. 6 and 7, the display colors of the printed material 502 and 3D objects 504 on the monitor are calculated. The display colors obtained in this way are composited and rendered on the monitor, thereby displaying the 3D model of the virtual environment 501 shown in FIG. 5 on the monitor. At this time, the color upon printing the image data and gloss, such as reflection, are satisfactorily reproduced on the printed material 502.

In this embodiment, the example in which the sRGB color space is used as image data and in color calculations using the CG has been described. However, other color spaces such as AdobeRGB may be used.

As described above, according to this embodiment, upon simulating a printed material using a CG, since the color upon printing and gloss such as reflection are satisfactorily reproduced, simulation of the printed material closer to a real printed material can be realized.

Second Embodiment

The second embodiment of the present invention will be described below. The second embodiment is characterized in that a glossy component is added to the color processing result based on the CMS by a method different from the aforementioned first embodiment. Since the system arrangement in the second embodiment is the same as that in the first embodiment, a repetitive description thereof will be avoided, and only characteristic processing in the second embodiment will be especially explained below.

[Generation of Simulation Image (Printed Material)]

Figure 8:
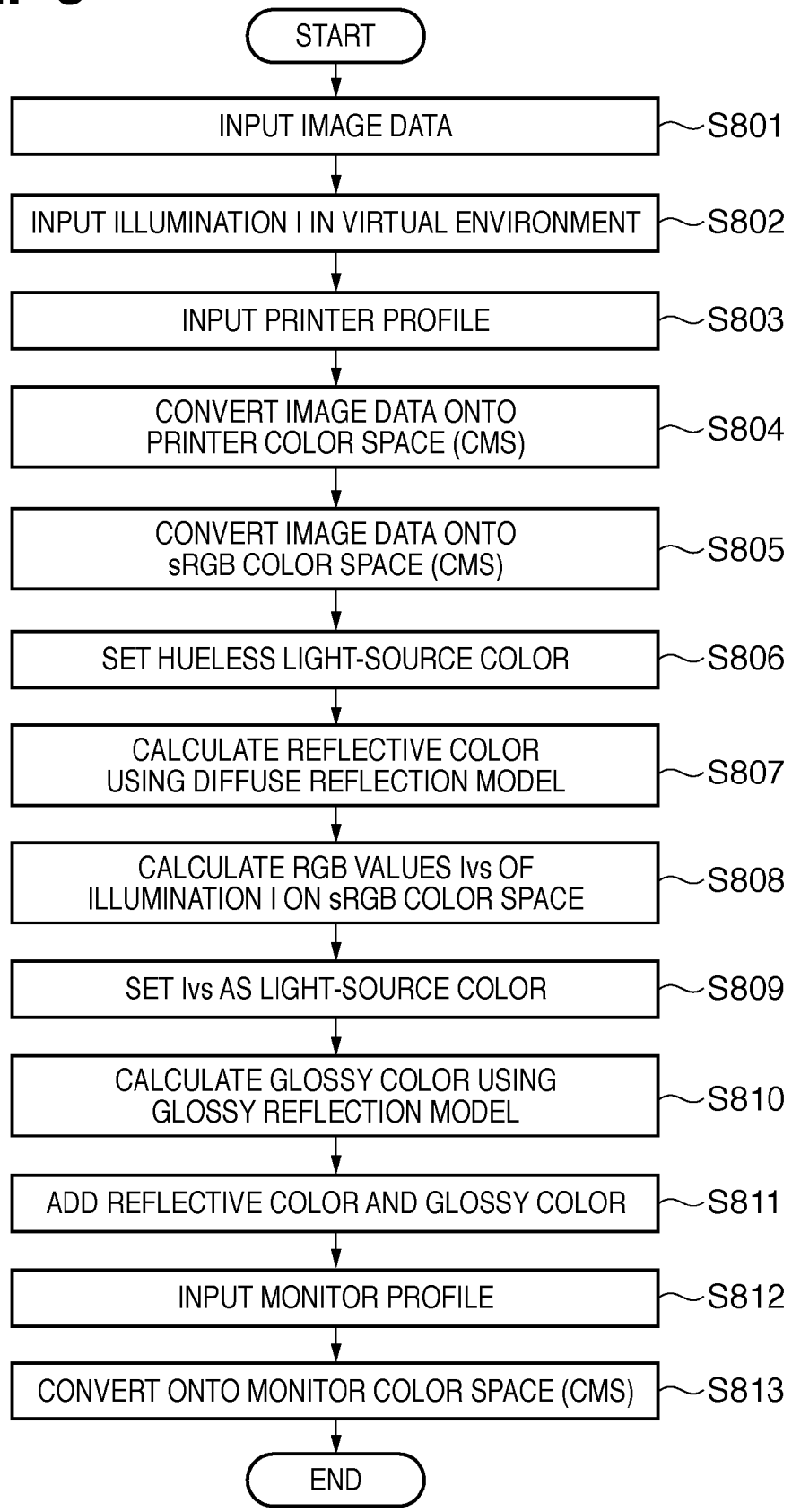
FIG. 8 is a flowchart showing simulation image generation processing of a printed material according to the second embodiment.

Processing for especially inputting image data as an object to be printed, and generating a proof image as the printed material 502 in the virtual environment 501 shown in FIG. 5 in simulation processing of the second embodiment will be described in detail below with reference to the flowchart shown in FIG. 8.

In step S801, image data on the sRGB color space, which serves as an object to be simulated, is input. In step S802, an illumination condition I in the virtual environment 501 shown in FIG. 5 is input as a first light-source color upon observing a print medium. As the illumination condition I, the color temperature of the illumination 503 and the type of a fluorescent lamp are input. In step S803, a printer profile is input. In step S804, the CMS engine 202 converts the input image data from the sRGB color space to the printer color space. As described in the first embodiment, as a rendering intent in the CMS engine 202, "Perceptual" is designated. As a result, the CMS engine 202 executes color conversion according to the illumination condition I of the virtual environment 501 input in step S802.

In step S805, a CMS engine (not shown) temporarily converts the image data from the print color space to the sRGB color space. At this time, "Absolute Colorimetric" is designated as a rendering intent.

In step S806, the light-source color of the illumination 503 is set to be an achromatic color. In step S807, a reflective color is calculated based on the diffuse reflection formula 302 by applying an achromatic light source to the printed material 502 in the virtual environment 501.

In step S808, a light-source color Ivs upon observing the illumination condition I in the virtual environment 501 on the sRGB color space is determined. In step S809, the obtained light-source color Ivs is set as the light-source color of the illumination 503.

In step S810, a glossy color is calculated based on the glossy reflection formula 304 using the light-source color Ivs with respect to the printed material 502.

In step S811, the reflective color and glossy color, which are calculated in the aforementioned steps, are added to each other to calculate a display color of the printed material 502 (addition image).

In step S812, a monitor profile is input. In step S813, the CMS engine 402 converts the display color calculated in step S811 from the sRGB color space to the monitor color space. In this way, the display color of the printed material 502 on the monitor can be acquired.

As described above, according to the second embodiment, upon applying the gloss addition processing to the printed material 502, the same method as that for the 3D objects 504 is applied. As a result, the processes in step S810 and subsequent steps in FIG. 8 in the second embodiment can be commonized with those in step S706 and subsequent steps shown in FIG. 7 in the first embodiment, thus simplifying the processing sequence.

However, in the second embodiment, when the color space of a printer is broad, color information may be lost by temporary conversion to the sRGB color space. For this reason, a color space with a broader gamut may be used in place of the sRGB color space.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119058, filed Apr. 30, 2008, which is hereby incorporated by reference herein in its entirety.

What is claimed is:

1. An image processing method for displaying a simulation image of an image formed on a print medium under a first light-source color on a display device under a second light-source color, comprising:
    an acquisition step of acquiring image data to be simulated in a format according to the second light-source color;
    a reflective color calculation step of calculating a reflective color obtained by processing the acquired image data so that the processed image data represents an image corresponding to the acquired image data illuminated by an achromatic light-source color;
    a glossy color calculation step of converting the first light-source color into the format according to the second light-source color, and calculating a glossy color of the image data based on the converted first light-source color; and
    a generation step of generating the simulation image to be displayed by adding the reflective color calculated in the reflective color calculation step and the glossy color calculated in the glossy color calculation step.

2. The method according to claim 1, wherein the acquisition step includes:
    a first color conversion step of applying color conversion according to the first light-source color to the image data; and
    a second color conversion step of applying color conversion according to the second light-source color to the image data which has undergone the color conversion in the first color conversion step.

3. The method according to claim 1, wherein the achromatic light-source color is set as a white point corresponding to the second light-source color.

4. The method according to claim 1, wherein in the reflective color calculation step, the reflective color is calculated based on a diffuse reflection model.

5. The method according to claim 1, wherein in the glossy color calculation step, the glossy color of the image data is calculated based on a glossy reflection model.

6. The method according to claim 1, further comprising:
    a peripheral image acquisition step of acquiring peripheral image data representing objects to be displayed around the simulated image at the time of simulation;
    a peripheral reflective color calculation step of calculating a reflective color to be obtained when the peripheral image data is processed to represent a peripheral image illuminated under the first light-source color;
    a peripheral glossy color calculation step of calculating a glossy color of the peripheral image data based on the first light-source color;
    a display peripheral image generation step of generating the peripheral image to be displayed by adding the reflective color calculated in the peripheral reflective color calculation step and the glossy color calculated in the peripheral glossy color calculation step;

a display peripheral image conversion step of converting the peripheral image to be displayed into the format according to the second light-source color; and a composition step of compositing the converted peripheral image to be displayed on the simulation image to be displayed.

7. The method according to claim 6, wherein the peripheral image data represents a three-dimensional object generated using computer graphics.

8. An image processing method for displaying an image formed on a print medium, which is observed under a first light-source color, on a display device under a second light-source color, so as to simulate the image, comprising:

an acquisition step of acquiring image data to be simulated in a format according to the first light-source color;

a reflective color calculation step of calculating a reflective color obtained by processing the acquired image data so that the processed image data represents an image corresponding to the acquired image data illuminated by an achromatic light-source color;

a glossy color calculation step of calculating a glossy color of the image data based on the first light-source color;

an addition step of generating an addition image by adding the reflective color calculated in the reflective color calculation step and the glossy color calculated in the glossy color calculation step; and a generation step of generating the simulation image to be displayed by converting the addition image into the format according to the second light-source color.

9. A computer program, stored in a non-transitory computer readable storage medium, causing a computer to execute an image processing method for displaying a simulation image of an image formed on a print medium under a first light-source color on a display device under a second light-source color, said method comprising:

an acquisition step of acquiring image data to be simulated in a format according to the second light-source color;

a reflective color calculation step of calculating a reflective color obtained by processing the acquired image data so that the processed image data represents an image corresponding to the acquired image data illuminated by is an achromatic light-source color;

a glossy color calculation step of converting the first light-source color into the format according to the second light-source color, and calculating a glossy color of the image data based on the converted first light-source color; and a generation step of generating the simulation image to be displayed by adding the reflective color calculated in the reflective color calculation step and the glossy color calculated in the glossy color calculation step.

10. An image processing apparatus for reproducing a simulation image of an image formed on a print medium under a first light-source color on a display device under a second light-source color, comprising:

an acquisition unit configured to acquire image data according to the second light-source color;

a lighting processing unit configured to apply lighting processing using an achromatic light-source color to the acquired image data according to the second light-source color;

a conversion unit configured to convert the first light-source color based on the second light-source color; and a gloss addition processing unit configured to execute processing for adding gloss to the image data that has undergone the lighting processing, based on the converted first light-source color.

* * * * *